No. 652,235. Patented June 19, 1900.
J. E. FULTON.
TWINE HOLDER.
(Application filed Feb. 19, 1900.)

(No Model.)

WITNESSES.
S. R. Pollard
Frank Hudson

INVENTOR.
James E. Fulton.
By Atty N. DuBois

UNITED STATES PATENT OFFICE.

JAMES E. FULTON, OF ATHENS, ILLINOIS.

TWINE-HOLDER.

SPECIFICATION forming part of Letters Patent No. 652,235, dated June 19, 1900.

Application filed February 19, 1900. Serial No. 5,739. (No model.)

*To all whom it may concern:*

Be it known that I, JAMES E. FULTON, a citizen of the United States, residing at Athens, in the county of Menard and State of Illinois, have invented certain new and useful Improvements in Twine-Holders, of which the following is such a full, clear, and exact description as will enable others skilled in the art to which it appertains to make and use my said invention.

My invention relates to twine-holders of that class which employ a winding-drum to take up the slack twine, so as to prevent the loose end of the twine from lying on the counter, where it is likely to become entangled, and so as to leave the free end of the twine in convenient position for use.

The purposes of my invention are to provide a drum of improved construction revoluble by a spring in one direction to wind the twine on the drum and revoluble in the opposite direction by pulling on the twine to unwind the twine, to provide a supporting-stand of novel and improved construction, to provide improved means for carrying the twine through the drum, to provide a removable cap adapted to facilitate the insertion or removal of the winding-spring, and to provide novel and improved means for connecting the drum with the stand.

With these ends in view my invention consists of the novel features of construction and combinations of parts shown in the annexed drawings, to which reference is hereby made, and in which similar reference-numerals designate like parts in the several views of the drawings.

Figure 1:
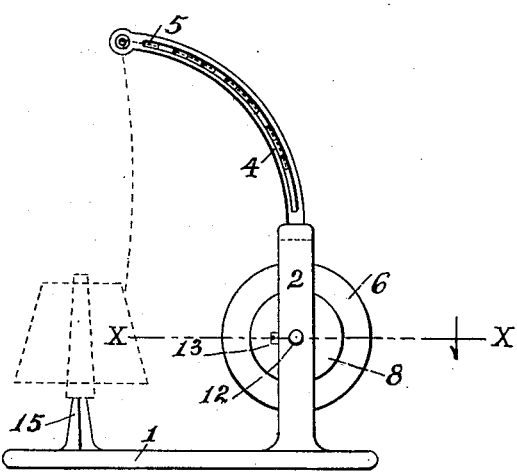
Figure 3:
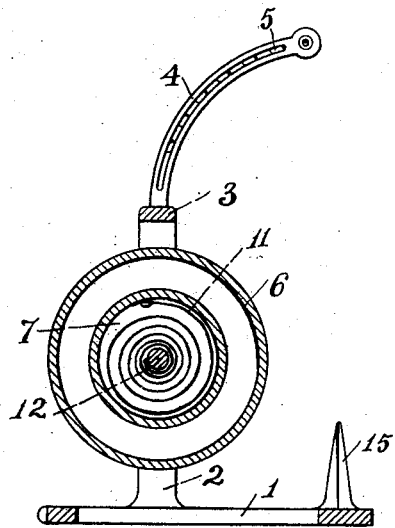
Figure 2:
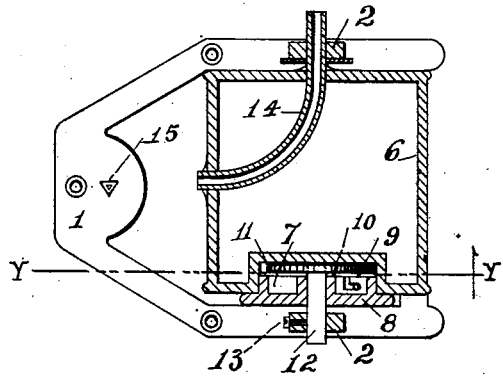

Referring to the drawings, Figure 1 is a side elevation of the complete apparatus. Fig. 2 is a horizontal section on the line X X of Fig. 1. Fig. 3 is a vertical transverse section on the line *y y* of Fig. 2.

The main frame, which is preferably a single casting, consists of a base 1, standards 2, a top cross-piece 3, and an arched and forwardly-extending arm 4. The arm 4 is pierced by holes 5, placed at intervals along the arm. The hole at the outer extremity of the arm is larger than the others and is adapted to receive a cord or wire, by means of which the twine-holder may be suspended from the ceiling or from any other suitable and convenient support. The twine passing from the ball is woven through the holes in the arm, so as to give proper tension to the twine, as hereinafter explained. The drum 6 is preferably made of sheet metal, and in one end of the drum is a box-shaped recess 7, adapted to inclose the winding-spring. A cylindrical cap 8 fits snugly in the recess 7 and is connected therewith by bayonet-fastenings 9 or other suitable securing devices. Integral with the cap 8 is an inwardly-extending hub or annulus 10. A helical spring 11 has one of its ends secured to the peripheral wall of the recess 7 and its other end secured to the pin 12. A pin 12 passes through a hole in one of the standards 2 and is secured thereto by a set-screw 13 or other suitable securing device, and the inner part of the pin projects through the hub 10, and the hub turns on the pin. A curved tube 14 has one extremity fixed in the outer or perimetal shell of the drum, and its other extremity projects through one end of the drum. The projecting part of the tube 14 is coaxial with the pin 12 and extends through a hole in one of the standards and forms a journal which turns in the standard. A vertical pin 15 on the base 1 supports the spool of the ball of twine.

In practical use the twine is threaded through the holes in the arm 4, is thence passed through the tube 14, and is wound by hand a number of times, usually three or four turns, around the drum 6. In tying a package the free end of the twine is pulled so as to rotate the drum by the unwinding of the twine from the drum. The turning of the drum operates to compress the spring 11, and as soon as the twine is released the spring reacts and rotates the drum, so as to wind the slack twine thereon.

I do not claim, broadly, the use of a drum rotatable in one direction by the unwinding of the twine and rotatable in the other direction by a spring, as I am aware that these features have heretofore been used; but I restrict my claim to the novel features of construction herein set forth.

Having fully described my invention, what I claim as new, and desire to secure by Letters Patent, is—

1. In a twine-holder the combination of a drum having a recessed end, a cap fitting in the recessed end of said drum and provided with a hub, a pin fitting in the hub of said cap, a guide-tube passing through said drum and having one extremity coaxial with said pin, means for rigidly supporting said pin, a bearing in which said guide-tube turns, and a spring having one end secured to said pin and the other end secured to the wall of the recess in said drum, substantially as set forth.

2. In a twine-holder the combination of a base 1, standards 2, a cross-piece 3, a perforated arched arm 4, a drum mounted to turn in the standards 2, a guide-tube passing through said drum, a spring housed in said drum and reacting to rotate same, and a cap inclosing said spring and detachably connected with said drum, substantially as shown and described, and for the purpose stated.

In witness whereof I have hereunto subscribed my name at Athens, Illinois, this 2d day of January, 1900.

JAMES E. FULTON.

Witnesses:
FRANK HURT,
JOHN BUCHANAN.